United States Patent
Hagino et al.

(10) Patent No.: US 7,264,715 B2
(45) Date of Patent: Sep. 4, 2007

(54) APPARATUS FOR TREATING ORGANIC WASTEWATER AND SLUDGE

(75) Inventors: Takao Hagino, Kanagawa (JP); Yuichi Fuchu, Tokyo (JP); Hideyuki Yoshida, Tokyo (JP); Masaaki Nishimoto, Kanagawa (JP); Kazuaki Shimamura, Kanagawa (JP)

(73) Assignee: Ebara Corporation, Tokyo (JP)

( * ) Notice: Subject to any disclaimer, the term of this patent is extended or adjusted under 35 U.S.C. 154(b) by 11 days.

(21) Appl. No.: 10/484,766

(22) PCT Filed: Apr. 17, 2003

(86) PCT No.: PCT/JP03/04909

§ 371 (c)(1),
(2), (4) Date: Aug. 30, 2004

(87) PCT Pub. No.: WO03/086990

PCT Pub. Date: Oct. 23, 2003

(65) Prior Publication Data

US 2005/0016919 A1   Jan. 27, 2005

(30) Foreign Application Priority Data

Apr. 18, 2002  (JP)  ............... 2002-116257
Jun. 26, 2002  (JP)  ............... 2002-186179

(51) Int. Cl.
*C02F 3/00*  (2006.01)
(52) U.S. Cl. ............... 210/198.1; 210/189; 210/512.1; 210/512.2
(58) Field of Classification Search ............ 210/198.1, 210/189, 512.1, 512.2
See application file for complete search history.

(56) References Cited

U.S. PATENT DOCUMENTS

| | | | | |
|---|---|---|---|---|
| 5,292,442 A | * | 3/1994 | Khan et al. | 210/770 |
| 5,360,546 A | * | 11/1994 | Tomita et al. | 210/603 |
| 6,464,875 B1 | * | 10/2002 | Woodruff | 210/603 |

FOREIGN PATENT DOCUMENTS

| | | |
|---|---|---|
| JP | 63-77600 | 4/1988 |
| JP | 9-220593 | 8/1997 |
| JP | 2001-149950 | 6/2001 |
| JP | 2002-45889 | 2/2002 |

* cited by examiner

Primary Examiner—Chester T. Barry
(74) Attorney, Agent, or Firm—Wenderoth, Lind & Ponack, L.L.P.

(57) ABSTRACT

A process and an apparatus for efficiently recovering magnesium ammonium phosphate (MAP) crystals of high purity and good quality in the technique of removing phosphorus and the like as MAP crystals from wastewater containing high concentration organic substance, phosphorus and nitrogen such as a digested supernatant liquor of human waste sewage and septic tank sludge, a digested liquor of sludge, chemical plant wastewater, and simultaneously recovering the MAP crystals. The sludge treatment process includes treating a sludge mixed liquor formed in the biological treatment system for organic wastewater in an anaerobic digestion tank to effect the digestion of sludge, simultaneously adding a magnesium source to the anaerobic digestion tank to allow crystals particles of MAP to form and grow in the anaerobic digestion tank, withdrawing a sludge mixed liquor containing the crystals of MAP from the anaerobic digestion tank, separating and recovering solids containing MAP crystal particles from the withdrawn sludge mixed liquor, and returning part of the sludge mixed liquor after separation and recovery of MAP crystal particles to the anaerobic digestion tank.

7 Claims, 4 Drawing Sheets

APPARATUS FOR TREATING ORGANIC WASTEWATER AND SLUDGE

TECHNICAL FIELD

The present invention relates to a system of treating organic wastewater or sludge in the sewage plant, various wastewater treatment facilities and the like, and more specifically, it relates to a process and an apparatus which remove phosphorus and the like as magnesium ammonium phosphate (hereinafter referred to as "MAP") crystals from wastewater containing high concentration organic substances, phosphorus and nitrogen such as a digested supernatant liquor of night soil and septic tank sludge, a digested liquor of sludge and chemical plant wastewater and, simultaneously efficiently recover the MAP crystals of high purity and good quality.

DESCRIPTION OF THE RELATED ART

As the conventionally typical simultaneous treatment method of denitrification and dephosphorization, there are biological treatment methods such as an anaerobic-anoxic-oxic process and the method by combining two or more of anaerobic-aerobic process, aggregation precipitation method, alumina adsorption method and the like. Further, in recent years, the MAP treatment method or the like which is aimed at returned liquor to be formed in a step of night soil treatment facilities and sewage treatment facilities, anaerobic digestion supernatant liquor and the like has been tried. The MAP treatment means the crystallization and removal of phosphorus in ammonium-containing water to be treated as MAP particles by adding a magnesium source and a pH adjustor to the water to be treated.

Of these treatment methods, the anaerobic-anoxic-oxic process has a problem of unstable treatment performance depending on the change in the water property and the change in the external environment caused by seasonal variation or the like, and the method by combining the anaerobic-aerobic process with the aggregation precipitation method has a problem of complication of the treatment step and, in addition, high running cost including the cost of chemicals. Contrast to this, the MAP treatment method reduces operational complication compared to the former two methods, and particularly enables stable recovery of phosphorus and adds value to the recovered MAP as a fertilizer, and accordingly can be said an excellent phosphorus and nitrogen removal technique from the standpoint of effective utilization of resources.

However, the MAP method has problems such that (1) the chemical cost of sodium hydroxide as the pH adjustor, magnesium chloride as the magnesium source and the like is high; (2) quick crystallization of MAP in a short period of time of about less than one hour (abbreviated as "quick MAP reaction") may form fine MAP particles which leak from the reactor to sometimes reduce the MAP recovery ratio to about 60 to 70%; (3) the quick MAP reaction causes intermingement of suspended solids (hereinafter referred to as "SS") with MAP crystals when about 400 mg/L or more of SS is present in a liquor to be treated, and thus high purity MAP crystals cannot be recovered; (4) when an anaerobic digestion step or the like is employed in the preceding stage of the MAP step, there is a problem such that in the anaerobic digestion step, the MAP reaction whose rate is determined by concentration of soluble magnesium in the sludge is already conducted in the reactor and due to the difficulty of separating formed MAP particles as such from SS, the formed MAP exists in the digested sludge and is not recovered and disposed together with the sludge.

As the means to solve the above described problems, the present inventors proposed a technique of efficiently recovering phosphorus in wastewater as MAP (JP-A-2002-45889). The outline of the method as proposed therein is shown in FIG. 4. Organic wastewater 1 is subjected to solid-liquid separation in a primary sedimentation tank 2 to separate a sludge mixed liquor 3 (first settled sludge), and then the supernatant liquor is subjected to biological treatment in a bioreactor 4. An activated sludge mixed liquor 5 discharged from the bioreactor 4 is subjected to solid-liquid separation in a secondary settling tank 6 and treated water 7 is withdrawn, and simultaneously a sludge mixed liquor 8 (excess sludge) is recovered. The sludge mixed liquors 3 and 8 formed in such an organic wastewater treatment system are introduced into an anaerobic digestion tank 51. A magnesium source 55 is fed into the anaerobic digestion tank 51 to effect the digestion of organic substances in the sludge by anaerobic bacteria in the digestion tank 51, and simultaneously the MAP formation reaction is advanced to form MAP crystal particles. Thus-obtained sludge mixed liquor containing MAP crystal particles is treated by an MAP recovery device 52 such as a hydrocyclone to separate and recover the formed MAP crystal particles 56. The sludge mixed liquor 57 after separation of the MAP crystal particles is introduced into a dehydrator 53 to recover the SS content as the dehydrated cake 58. The separated water 59 obtained in the dehydrator is introduced into a second crystallization tank 54, added with a magnesium source 60 and a pH adjustor 61, and mixed to form and recover MAP particles 62 again. The supernatant liquor 63 after recovery of the MAP particles can be returned to the primary sedimentation tank 2. According to this method, fine particles of MAP and unreacted phosphorus to be mixed into the separated water in the first stage of the MAP formation and recovery step in the anaerobic digestion tank are crystallized and allowed to grow for recovery in the second stage of the MAP formation step in the second crystallization tank, and accordingly the recovery ratio of phosphorus in the wastewater could be increased to a great extent.

As the result of further investigating this method in detail by the present inventors, it has been found that speaking from the standpoint of its economy or its easiness of operation, further improvement such as increase and stabilization of the MAP recovery ratio, enhancement of the purity of the formed MAP, reduction of the amount of chemicals to be used, and simplification of the treatment system is required.

SUMMARY OF THE INVENTION

The present invention has an object to solve the above described problems of the conventional technique and to further improve the method proposed by JP-A 2002-45889. Namely, the present invention provides a process and an apparatus which remarkably reduce the amount of chemicals to be used and, simultaneously, remarkably improve and stabilize the removal ratio of nitrogen and phosphorus, and furthermore enable enhancement of the purity of the formed MAP and, simultaneously, enable simplification of the treatment system in the MAP treatment process comprising subjecting particularly the wastewater containing organic substances, nitrogen and phosphorus such as the wastewater or sludge which contain high concentration organic substances, nitrogen and phosphorus, for example, a digested supernatant liquor of night soil and septic tank sludge, a digested liquor of sludge and chemical plant wastewater, in the organic wastewater or sludge treatment system, to anaerobic treatment and, simultaneously removing the phosphorus in the water to be treated as magnesium ammonium phosphate crystals.

The present invention solves the above described problems by the means shown below.

1. A sludge treatment process comprising treating a sludge mixed liquor formed in the biological treatment system for organic wastewater in an anaerobic digestion tank to effect the digestion of sludge, simultaneously adding a magnesium source to the anaerobic digestion tank to allow crystal particles of magnesium ammonium phosphate to form and grow in the anaerobic digestion tank, withdrawing a sludge mixed liquor containing the crystals of magnesium ammonium phosphate from the anaerobic digestion tank, separating and recovering solids containing magnesium ammonium phosphate crystal particles from the withdrawn sludge mixed liquor and returning part of the sludge mixed liquor after separation and recovery of the magnesium ammonium phosphate crystal particles to the anaerobic digestion tank.

2. The process of the above described Item 1, wherein the step of separating and recovering solids containing magnesium ammonium phosphate crystal particles from the withdrawn sludge mixed liquor is carried out by a hydrocyclone.

3. The process of the above described Item 1 or Item 2, wherein the magnesium source to be added to the anaerobic digestion tank is magnesium hydroxide or magnesium oxide.

4. The process of the above described Item 3, wherein as the magnesium source, a solution obtained by dissolving magnesium hydroxide or magnesium oxide into seawater or well water is added to the anaerobic digestion tank.

5. The process of any one of the above described Items 1 to 4, wherein the amount of the sludge mixed liquor to be returned to the anaerobic digestion tank after separation and recovery of the magnesium ammonium phosphate crystal particles is 0.5 to 4 times the amount of the sludge mixed liquor to be introduced into the anaerobic digestion tank.

Figure 1:
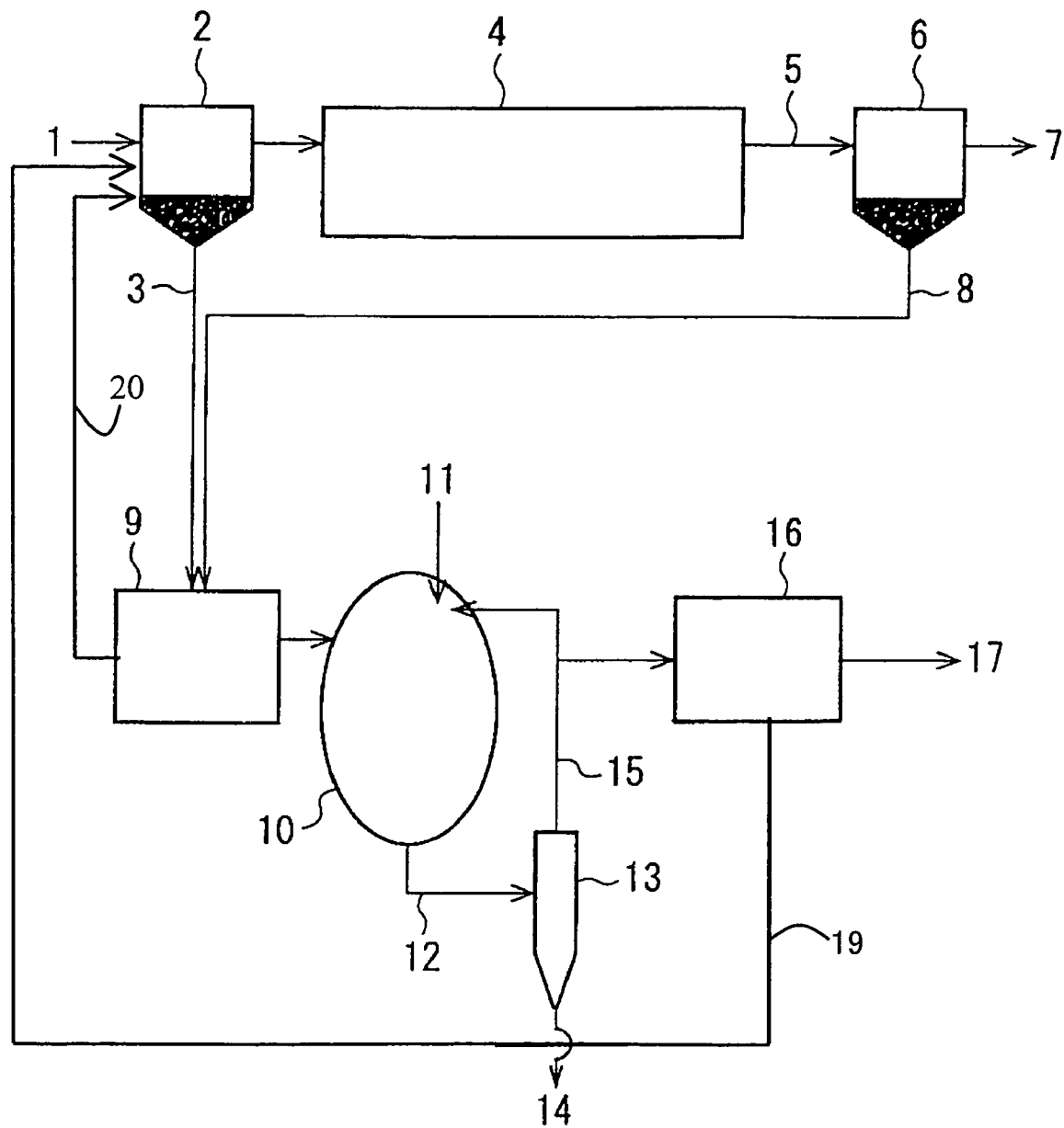
FIG. 1 is a block diagram showing a general view of an organic wastewater treatment process comprising treating the concentrated sludge to be discharged from an organic wastewater treatment system by the treatment method relating to one embodiment of the present invention to digest the sludge and remove phosphorus by the formation and recovery of MAP.

In the Figures, each reference mark means as follows.

Numeral 1 is influent organic wastewater; numeral 2 is a primary sedimentation tank; numeral 3 is a mixed sludge liquor; numeral 4 is a bioreactor; numeral 5 is an activated sludge mixed liquor; numeral 6 is a secondary settling tank; numeral 7 is treated water; numeral 8 is a sludge mixed liquor; numeral 9 is a sludge concentrator; numeral 10 is an anaerobic digestion tank; numeral 11 is a magnesium source; numeral 12 is a withdrawn sludge; numeral 13 is an MAP recovery device; numeral 14 is recovered MAP; numeral 15 is a sludge mixed liquor after separation and recovery of MAP particles; numeral 16 is a dehydrator; numeral 17 is dehydrated cake; numeral 19 is a dehydration filtrate; numeral 20 is a thickener effluent from the sludge concentrator; numeral 32 is an acid fermentor; numeral 33 is a particle aging tank; numeral 34 is sludge to be introduced into the anaerobic digestion tank; numeral 35 is grown MAP particles; numeral 36 is a magnesium source; and numeral 37 is a pH adjustor.

DETAILED DESCRIPTION OF THE INVENTION

One embodiment of the present invention will be explained below on the basis of FIG. 1.

FIG. 1 is a block diagram showing a general view of the process which treats concentrated sludge to be discharged from an organic wastewater treatment system constituted of a primary sedimentation tank 2, a bioreactor 4 such as an aeration tank and a secondary settling tank 6 by the treatment method relating to one embodiment of the present invention to effect digestion of sludge and removal of phosphorus by formation and recovery of MAP. In the organic wastewater treatment system, organic wastewater 1 of an object of treatment is subjected to solid-liquid separation in the primary sedimentation tank 2 to separate and remove a sludge mixed liquor 3 (first settled sludge), and then the supernatant liquor is subjected to biological treatment in the bioreactor 4. The activated sludge mixed liquor 5 to be discharged from the bioreactor 4 is subjected to solid-liquid separation in the secondary settling tank 6 and treated water 7 is withdrawn, and simultaneously a sludge mixed liquor 8 (excess sludge) is recovered. The sludge mixed liquors 3 and 8 to be formed in such an organic wastewater treatment system are concentrated in a sludge concentrator 9, then introduced into an anaerobic digestion tank 10 to effect anaerobic digestion of organic sludge by acid fermentation, methane fermentation or the like. The thickener effluent 20 from the sludge concentrator 9 can be returned to the primary sedimentation tank 2. In the anaerobic digestion tank 10, a magnesium source 11 is supplied and by the reaction with the phosphorus and ammonia in the water to be treated, MAP particles are formed to grow by crystallization reaction.

After the anaerobic digestion of the organic sludge and the formation and growth of MAP particles in the anaerobic digestion tank 10, a sludge mixed liquor or wastewater (hereinafter referred to as "sludge mixed liquor") is withdrawn from the anaerobic digestion tank 10, and MAP particles are separated and recovered from the sludge mixed liquor in a MAP recovery device 13. A hydrocyclone can be used as the MAP recovery device 13 and the technique in the mining field such as ore floatation which is utilized in the mining field can also be used.

Part of the sludge mixed liquor 15 from which MAP particles 14 have been separated and removed in the MAP recovery device 13 is introduced into a sludge dehydrator 16, subjected to dehydration treatment, and then discharged out of the system as waste 17 in the form of dehydrated cake or the like. The dehydration filtrate 19 to be discharged from the sludge dehydrator can be returned to the primary sedimentation tank 2. The important point in the process relating to one embodiment of the present invention as shown in FIG. 1 is to return part of the sludge mixed liquor 15 after separation and recovery of MAP particles to the anaerobic digestion tank 10. In sludge mixed liquor after separation and recovery of MAP particles by a MAP recovery device such as a hydrocyclone, fine MAP particles having a diameter of about 100 μm which cannot completely be separated and removed by the MAP recovery device 13 remain although its amount is small. By returning this sludge mixed liquor to the anaerobic digestion tank 10, the fine MAP particles may be used as the MAP seed particles (seed crystals) in the anaerobic digestion tank 10. It has been found from the investigations by the present inventors that by advancing the MAP crystallization reaction in the presence of fine MAP seed crystals in the anaerobic digestion tank 10, the average particle diameter of the formed MAP particles can be further increased and made uniform.

After repeating various experiments by the present inventors, it has been found that it is appropriate to set the amount of the sludge mixed liquor to be returned from the MAP recovery device 13 to the anaerobic digestion tank 10 at 0.5 to 4 times the amount of the sludge mixed liquor to be introduced into the anaerobic digestion tank 10. With amounts of the sludge mixed liquor to be returned of less than 0.5 time the amount of that to be introduced, the change in the formed particle diameter is not observed and with amounts of that of more than 4 times, the effect of further improvement cannot be observed.

In order to increase the recovery ratio of MAP in the anaerobic digestion tank 10, it is necessary to increase the ratio of MAP particles having high purity and a large diameter. For that, it is necessary to create conditions most suitable for the MAP crystallization within the anaerobic digestion tank 10. Thus, it is preferred to employ an agitation mechanism in the anaerobic digestion tank which has a shape so as to efficiently make the inside of the anaerobic digestion tank uniform and easily collect MAP particles having a high specific density in the bottom portion of the tank near a withdrawal pipe. For example, in an oval or hexagonal anaerobic digestion tank, an agitation method which has a draft tube in the center of the tank and an air lift pump in the draft tube and causes a revolving flow from the ascending flow in the draft tube is comparatively effective as the agitation system of allowing MAP particles to grow and age. The sludge withdrawal pipe is preferably connected to the portion where MAP particles having a high specific gravity settled in the bottom portion of the anaerobic digestion tank 10 easily collect.

The sludge mixed liquor 12 withdrawn from the anaerobic digestion tank 10 can be treated by a solid-liquid separator utilizing specific gravity difference as the MAP recovery device 13 and can be separated into solids mainly containing MAP particles and a liquor other than the solids, that is, a sludge mixed liquor 15. Particularly, the use of a hydrocyclone as the solid-liquid separator enables easy solid-liquid separation of solids containing MAP particles or the like from a sludge mixed liquor. The solids mainly containing MAP crystal particles can be further separated from other impurities to further increase the MAP purity in the recovered solids. Part of the sludge mixed liquor 15 from which MAP particles have been removed is led to a sludge dehydrator 16 and subjected to dehydration treatment. At this point of time, MAP particles intermingled with the sludge mixed liquor are remarkably reduced, and thus even when dehydrated cake 17 after the dehydration treatment is disposed as waste, the phosphorus content in the dehydrated cake is comparatively small, and accordingly is effective from the standpoint of recycling phosphorus. As described above, part of fine MAP particles having a particle diameter of 100 μm or less remains in the sludge mixed liquid after the treatment by the solid-liquid separator such as a hydrocyclone, and thus by returning the remaining sludge mixed liquor other than the sludge mixed liquor to be sent to the sludge dehydrator 16 to the anaerobic digestion tank 10 from its upper part, the fine MAP particles are provided as the seed particles for crystallization reaction and can be allowed to grow in the anaerobic digestion tank 10 to a level of a particle diameter of 100 μm or more which is easy for solid-liquid separation.

As the magnesium source to be introduced in the anaerobic digestion tank 10, a magnesium compound hardly soluble in water is preferably used.

As the result of the investigations of various conditions for allowing high purity MAP particles to uniformly grow and maintaining a high recovery ratio of MAP particles by the present inventors, it has been found that in order to uniformly cause the MAP formation reaction in a tank such as the anaerobic digestion tank having a very long residence time, it is important to render the magnesium ion concentration low. The reaction of the MAP formation is shown by the following chemical reaction formula (1).

$$PO_4^{3-} + NH_4^+ + Mg^{2+} + 6H_2O \rightarrow MgNH_4PO_4 \cdot 6H_2O \qquad (1)$$

Figure 2:
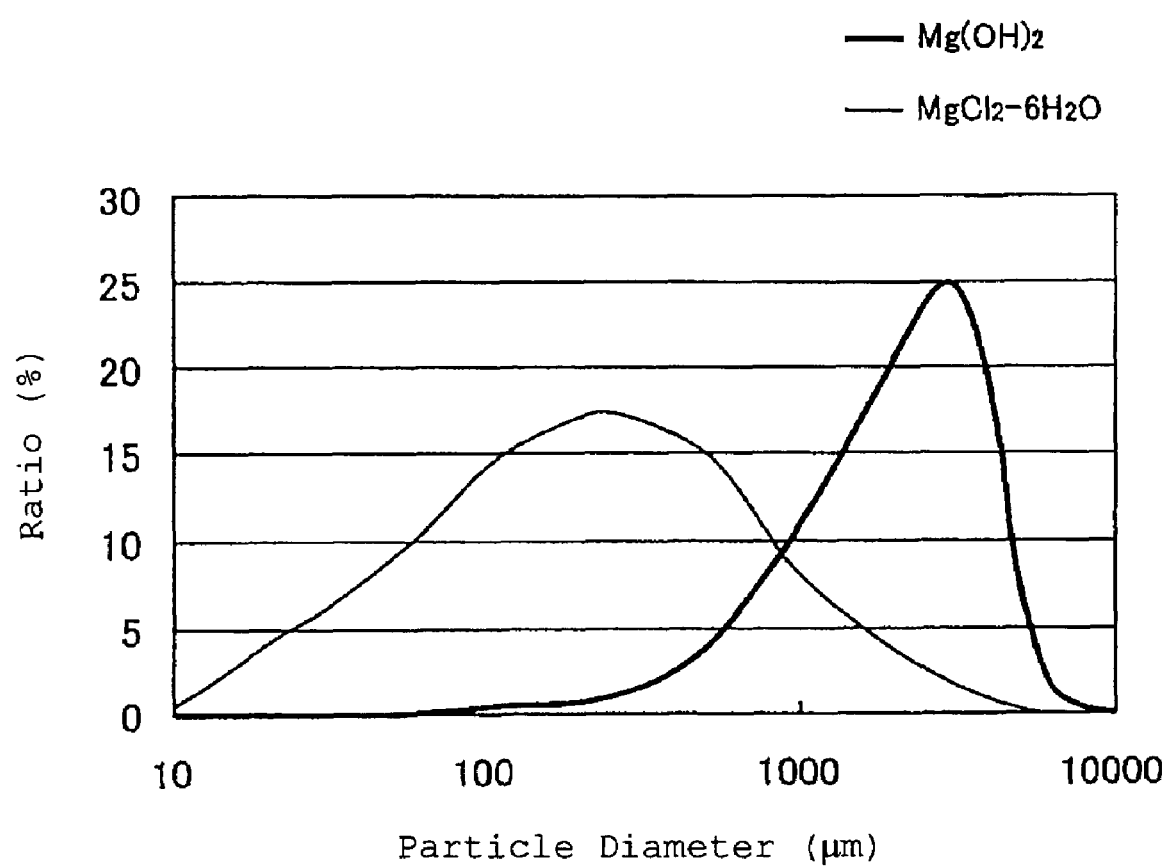
FIG. 2 is a graph showing the difference in the particle diameter distribution of formed MAP particles depending on the kind of a magnesium source to be introduced into the MAP formation reaction.

In the anaerobic digestion tank where this MAP formation reaction is advanced, ammonium ions which participate in the MAP reaction are normally in a large excess state since organic sludge is subjected to anaerobic treatment. Accordingly, when the magnesium source is added to a tank such as the anaerobic digestion tank 10 having a long residence time, in other words, a very large tank as a magnesium salt having a very high solubility, magnesium ions become locally excessive to cause a portion where the MAP reaction partially proceeds to a great extent and a portion where the magnesium ion concentration is low and the MAP reaction hardly proceeds. As a result, a big difference is found in the particle diameter of the formed MAP particles. In FIG. 2, the result of observing the particle size distribution of the formed MAP particles when magnesium chloride ($MgCl_2 \cdot 6H_2O$) having a high solubility is used to advance the MAP formation reaction and when magnesium hydroxide [$Mg(OH)_2$] hardly soluble in water is used is shown. From FIG. 2 it can be understood that in the case of magnesium chloride used, the particle diameter is broadly distributed from the small one to the large one and is ununiform, while in the case of magnesium hydroxide used, the particle diameter is shifted to the larger side and the distribution is narrow.

Further, more important, when the magnesium ion concentration is locally high and the MAP formation reaction quickly proceeds, SS (sludge) is taken in MAP when the MAP is formed and the tendency of lowering the purity of the formed MAP is also observed. As in the anaerobic digestion tank 10 with a residence time of several tens of days, high purity MAP particles can be allowed to grow by slow aging. For that, it is important that the magnesium ion concentration in the liquor is reduced to an appropriate level or lower and to reduce the rate of reaction to slowly bring about an equilibrium state, and thus a hardly soluble magnesium compound is preferably used as the magnesium source.

The magnesium compound hardly soluble in water may be any magnesium compound which can be industrially utilized such as magnesium hydroxide and magnesium oxide.

As explained above, in order to reduce the concentration of magnesium ions in the liquor to an appropriate level or lower, and to reduce the rate of reaction to slowly bring about an equilibrium state, it is preferred to feed the hardly soluble magnesium compound dispersed in water to the anaerobic digestion tank 10, to thereby inhibit formation of a portion having a high local magnesium ion concentration. As the dispersion medium for dispersing the hardly soluble magnesium for this purpose, in addition to water, seawater and well water can be used. Particularly, seawater and well water which contain a magnesium ion can be effectively utilized as the magnesium source in the MAP formation reaction, whereby the amount of the magnesium compound to be fed from outside can be reduced. Thus, particularly when the wastewater treatment facilities are on the coast or in the mountain regions, easily available seawater and well water are preferably used as the dispersion medium for the magnesium compound.

The present invention relates to an apparatus for carrying out the above explained method. Namely, another embodiment of the present invention also relates to a sludge treatment apparatus comprising an anaerobic digestion tank for receiving a sludge mixed liquor formed in the biological treatment system for organic wastewater to effect the digestion of sludge and, simultaneously, the formation and growth of magnesium ammonium phosphate crystal particles; a magnesium source feeder for feeding a magnesium source to the anaerobic digestion tank; a sludge withdrawal pipe for withdrawing a sludge mixed liquor from the anaerobic digestion tank; a solid-liquid separator for receiving the sludge mixed liquor withdrawn from the anaerobic digestion tank through the sludge withdrawal pipe and separating and recovering solids containing the magnesium ammonium phosphate crystal particles; and piping for returning part the sludge mixed liquor after separation and recovery of the magnesium ammonium phosphate crystal particles to be recovered from the solid-liquid separator to the anaerobic digestion tank. Further, the present invention relates to the above described apparatus in which the solid-liquid separator is a hydrocyclone.

Further, the above described technical concept can be applied not only to the recovery of MAP from the sludge mixed liquor to be discharged from the biological treatment facilities for organic wastewater but also to the recovery of ions in various liquids by utilizing crystallization reaction. Namely, another embodiment of the present invention is a process for removing the ions in a liquid to be treated by crystallization method, and particularly it relates to a process for removing ions in a liquid which comprises introducing water to be treated containing an ion to be removed into a crystallization reactor, feeding an ion capable of forming a hardly soluble salt by the reaction with the ion to be removed into the crystallization reactor to allow crystal particles of the hardly soluble salt of the ion to be removed to grow, then subjecting the reaction solution to solid-liquid separation to separate and recover the formed crystal particles, and returning part of the reaction solution after separation and recovery of the formed crystal particles to the crystallization reactor. By this method, the fine crystal particles which remain in the reaction solution after separation and recovery of the formed crystal particles and could not completely be separated by solid-liquid separation are fed to the crystallization reactor to effect crystallization reaction using them as seed crystal particles, and thus the average particle diameter of the crystal particles to be formed can be increased and made uniform.

According to the above described another embodiment of the present invention, for example, by adding calcium to wastewater such as secondary effluent of sewage and returned water from sludge treatment system to deposit crystals of calcium phosphate $[Ca_3(PO_4)_2]$ or hydroxyapatite $[Ca_{10}(PO_4)_6(OH)_2:HAP]$, the phosphate ion in the wastewater can be removed; or by adding calcium to the wastewater in a semiconductor plant containing a large amount of fluorine ions, crystals of calcium fluoride ($CaF_2$) can be formed to thereby remove fluorine ions in the wastewater; or by adding a pH adjustor or a carbon source to city water using underground water as the raw water, wastewater, garbage infusion water and the like to deposit crystals of calcium carbonate, the calcium ion in the water to be treated can be removed; or by adding a calcium ion to hard water containing a large amount of carbonate ions to deposit crystals of calcium carbonate, the hardness of the water can be lowered. Furthermore, by adding a carbonate ion to tap water to deposit crystals of manganese carbonate, the manganese of an impurity in the tap water can be removed. In any field, according to the present invention, the average particle diameter of crystal particles to be allowed to form and grow by crystallization reaction can be increased and made uniform.

Further, the present invention relates to an apparatus for carrying out the above described method. In other words, another embodiment of the present invention relates to a crystallization reaction apparatus comprising a crystallization reactor for receiving water to be treated containing an ion to be removed to form a hardly soluble salt of the ion to be treated; a salt-forming ion feeder for feeding an ion capable of forming the hardly soluble salt by the reaction with the ion to be removed in the water to be treated into the crystallization reactor; a reaction solution discharge pipe for withdrawing the reaction solution after reaction from the crystallization reactor; a solid-liquid separator for subjecting the reaction solution withdrawn from the crystallization reactor through the reaction discharge pipe to solid-liquid separation to separate and recover the grown crystal particles; and piping for returning part of the reaction solution after separation and recovery of the grown crystal particles to be recovered from the solid-liquid separator to the crystallization reactor.

Furthermore, the present invention can be also applied to the sludge treatment process which installs a fermentor as the preceding stage of the anaerobic digestion tank for sludge treatment. The anaerobic digestion of organic sludge mainly proceeds by acid fermentation and methane fermentation. Namely, organic components in the sludge are decomposed by the action of acid fermentation bacteria to form organic acids such as lactic acid, butyric acid, propionic acid, and acetic acid, and these acids are successively decomposed by the action of methane fermentation bacteria. In this technique, both acid fermentation and methane fermentation are normally carried out in a single anaerobic tank on account of a problem of the space of installing the reactor and operational simplicity, but biologically it is efficient and ideal that the acid fermentation of the organic sludge is first carried out in a acid fermentor, and then the methane fermentation is carried out in an anaerobic tank. Another embodiment of the present invention is to provide a process for extremely efficiently carrying out the digestion treatment of sludge and the formation and growth of MAP in the sludge treatment process having such a constitution of acid fermentation tank-anaerobic tank.

Namely, another embodiment of the present invention relates to a sludge treatment process comprising subjecting a sludge mixed liquor to be formed in the biological treatment system for organic wastewater to acid fermentation treatment in an acid fermentor, then adding a magnesium source to the liquor in a particle aging tank to allow crystal particles of magnesium ammonium phosphate to grow, then treating the sludge mixed liquor in an anaerobic digestion tank to effect the digestion of sludge and the growth of crystal particles of magnesium ammonium phosphate, withdrawing the sludge mixed liquor containing magnesium ammonium phosphate crystal particles from the anaerobic digestion tank, separating and recovering solids containing the crystal particles of magnesium ammonium phosphate from the withdrawn sludge mixed liquor, feeding part of the sludge mixed liquid after separation and recovery of magnesium ammonium phosphate crystal particles into the acid fermentor, and simultaneously feeding the separated and recovered magnesium ammonium phosphate crystal particles into the particle aging tank.

Figure 3:
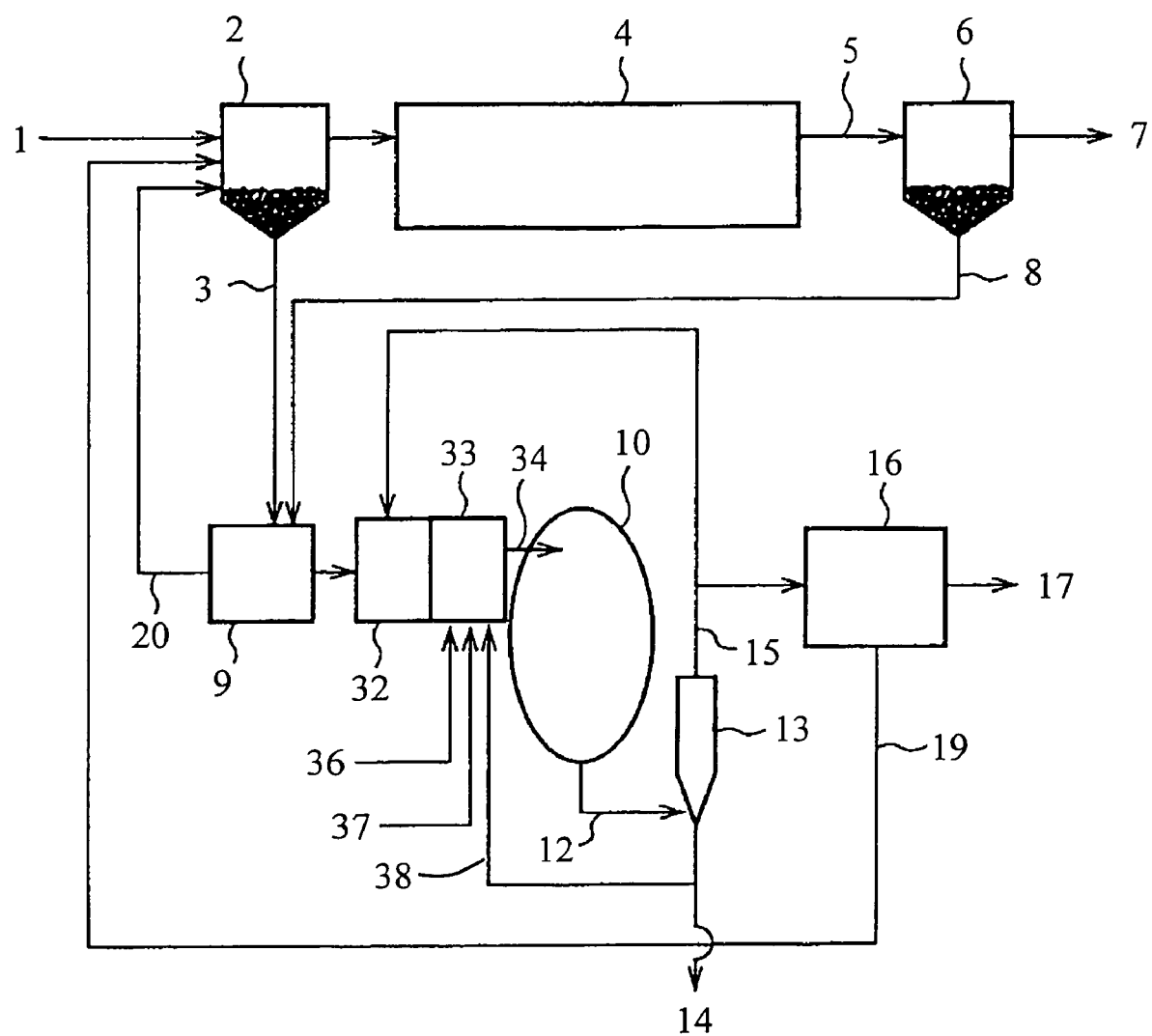
FIG. 3 is a block diagram showing a general view of an organic wastewater treatment process relating to another embodiment of the present invention.

Such an embodiment of the present invention will be explained based on FIG. 3. In FIG. 3, the same constitution elements as in FIG. 1 are shown by the same reference numbers as in FIG. 1 and their explanation will be omitted. FIG. 3 is a block diagram showing a general view of the process which comprises treating concentrated sludge to be discharged from an organic wastewater treatment system constituted of a primary sedimentation tank 2, a bioreactor 4 such as an aeration tank and a secondary settling tank 6 according to the above described treatment process of the present invention to carry out removal of phosphorus by the digestion of sludge and formation and recovery of MAP.

The first settled sludge 8 and the excess slurry 8 to be discharged from the primary sedimentation tank 2 and the secondary settling tank 6 in an organic wastewater treatment system are condensed and separated in a sludge concentrator 9. The thickener effluent 20 from the concentrator can be returned to the primary sedimentation tank 2. Organic components in the sludge mixed liquor concentrated in the sludge concentrator 9 is decomposed by acid fermentation bacteria in an acid fermentor 32, then added with a magnesium source 36 such as magnesium hydroxide and magnesium oxide and, if necessary, a pH adjustor 37 in a particle aging tank 33 to effect the growth of MAP particles, subsequently subjected to sludge digestion treatment by methane fermentation or the like in an anaerobic digestion tank 10 and the growth of MAP particles, and then the grown MAP particles are separated and recovered in a solid-liquid separator 13 such as a hydrocyclone. Part 38 of the separated and recovered grown MAP particles are fed to a particle aging tank 33, and part of the sludge mixed liquor 15 after separation and recovery of the grown MAP particles is fed to an acid fermentor 32.

In the acid fermentor 32, the organic components in the sludge are decomposed by acid fermentation bacteria, and organic acids such as lactic acid, butyric acid, propionic acid, and acetic acid are formed with the progression of the acid fermentation to decrease the pH, and the reaction rate of the acid fermentation is decreased or stopped. However, in the system as shown in FIG. 3, part of the sludge mixed liquor 15 after separation and recovery of the grown MAP particles is fed to the acid fermentor 32. The sludge mixed liquor 15 after the digestion treatment in the anaerobic digestion tank 10 and separation and recovery of the grown MAP particles contains a large amount of alkali components, and by feeding this sludge mixed liquor to the acid fermentor 32, the lowering of pH in the acid fermentor 32 can be inhibited to continue and accelerate acid fermentation reaction.

The sludge mixed liquor treated in the acid fermentor 32 is successively introduced into a particle aging tank 33, and added herein with a magnesium source 36 and, if necessary, a pH adjustor 37 to effect the growth of MAP particles. In the system as shown in FIG. 3, part 38 of the grown MAP particles having a particle diameter of about not smaller than 100 μm after their separation and recovery in the solid-liquid separator 13 are fed to the particle aging tank 33. The grown MAP particles fed to the particle aging 33 act as seed crystals in the aging tank. MAP is deposited on the surfaces of these MAP seed crystals to grow. In other words, since magnesium, orthophosphoric acid, an ammonium ion and seed crystals are appropriately present in the particle aging tank 33, the environment where the MAP particles are easy to grow can be created by maintaining the pH in the neutral region. When the pH is rendered too high in the particle aging tank 33, a large amount of fine MAP particles is formed to make recovery of MAP difficult.

Furthermore, in the system as shown in FIG. 3, part of the sludge mixed liquor 15 after separation and recovery of the grown MAP particles is fed to the acid fermentor 32. This sludge mixed liquor 15 contains fine MAP particles which could not be completely separated in the solid-liquid separator 13. It has been found that when this sludge mixed liquor is fed to the acid fermentor 32, fine MAP particles are dissolved out as the soluble phosphorus under an acidic pH condition in the acid fermentor 32. Accordingly, in the system as shown in FIG. 3, due to the dissolution of fine MAP particles in the acid fermentor 32, a larger amount of ions to form MAP is to exist in the particle aging tank 33 of the succeeding stage, and by introducing the grown MAP particles 38 thereinto as seed crystals, the crystallization of MAP on the surfaces of the MAP seed crystals can be further accelerated to more effectively perform the growth of MAP particles.

The sludge mixed liquor 34 containing the MAP particles grown in the particle aging tank 33 is subsequently introduced into an anaerobic tank 10. In general, the size of anaerobic digestion tank 10 is preferably 10 to 30 times the volume of the particle aging tank 33. In the anaerobic digestion tank 10, soluble phosphorus, magnesium and ammonia are dissolved out with the progression of anaerobic decomposition of organic substances during a residence time of 20 days or more, and thus the MAP formation reaction is further caused to allow MAP particles to grow. It is desirable in the formation of MAP particles having high purity and a large diameter (at least 300 μm φ) that in the anaerobic digestion tank 10, the pH is maintained in a neutral region of 7.0 to 7.6 and the magnesium concentration is maintained at a low level of about 10 to 30 mg/L.

The sludge mixed liquor 12 containing a large amount of the grown MAP particles is withdrawn from the bottom portion of the anaerobic digestion tank 10 and separated into the recovered MAP 14 in the form of slurry mainly containing the grown MAP particles and a sludge mixed liquor 15 almost free of MAP particles having a particle diameter (φ) of 100 μm or more by the solid-liquid separator 13 such as a hydrocyclone. As described above, part 38 of the recovered MAP particles is led to the particle aging tank 33 and used as the seed crystals for accelerating the MAP crystallization reaction. Further, the sludge mixed liquor 15 from which the grown MAP particles have been separated is partially led to the acid fermentor 32 and the remaining sludge mixed liquor is introduced into the hydrator 16 and subjected to hydration treatment.

The present invention relates to an apparatus for carrying out the method relating to the above-mentioned another embodiment of the present invention. Namely, still another embodiment of the present invention relates to a sludge treatment apparatus comprising an acid fermentor for receiving a sludge mixed liquor to be formed in the biological treatment system for organic wastewater to effect the treatment of sludge by acid fermentation; a particle aging tank where a magnesium source is added to the sludge mixed liquor to be discharged from the acid fermentor to allow crystal particles of magnesium ammonium phosphate to grow; a magnesium source feeder for feeding a magnesium source to the particle aging tank; an anaerobic digestion tank for receiving a sludge mixed liquor to be discharged from the particle aging tank to effect the digestion of sludge and the growth of crystal particles of magnesium ammonium phosphate; a sludge withdrawal pipe for withdrawing a sludge mixed liquor from the anaerobic digestion tank; a solid-liquid separator for receiving the sludge mixed liquor withdrawn from the anaerobic digestion tank through the sludge withdrawal pipe to separate and recover solids containing the magnesium ammonium phosphate crystal particles; piping for feeding part of the sludge mixed liquor after separation and recovery of the magnesium ammonium phosphate crystal particles to be recovered from the solid-liquid separator into the acid fermentor; and piping for feeding the crystal particles of magnesium ammonium phosphate to be recovered from the solid-liquid separator to the particle aging tank.

Various modes of the present invention will now be more concretely explained by examples but the present invention is not to be limited thereto.

EXAMPLE 1

In the present example, the experiment of anaerobic digestion and formation and recovery of MAP was carried out with the use of the sludge in sewage plant "A" by an apparatus having a constitution as shown in FIG. 1. The first settled sludge 3 in the primary sedimentation tank 2 and the excess sludge 8 in the secondary settling tank 6 were mixed at a ratio of about 1:1, and subsequently subjected to medium temperature anaerobic digestion treatment in an oval anaerobic digestion tank 10 with a residence time of 25 days. As the hardly soluble magnesium source 11 for forming MAP in the anaerobic digestion tank 10, 35% magnesium hydroxide was diluted with water to a concentration of 10%, and then mixed with the sludge to be introduced, and the resulting mixed sludge was introduced into the anaerobic digestion tank 10.

The amount of the magnesium hydroxide added was adjusted so as to render the Mg concentration in the anaerobic digestion tank in the range of 10 to 30 mg/L. As the agitation method, a draft tube plus air lifting system was employed. Although any pH adjustor was not used, the pH in the tank was changed within the range of 7.0 to 7.6 during the experiment. From the bottom portion of the oval anaerobic digestion tank, the sludge 12 was withdrawn in an amount of three times (3Q) the amount (1Q) of the sludge introduced, and MAP crystals 14 were separated and recovered by a hydrocyclone 13. Of the sludge mixed liquor 15 after separation of the MAP crystals, 1Q was subjected to dehydration treatment and the remaining 2Q was returned to the oval anaerobic digestion tank 10. This remaining 2Q of the sludge mixed liquor to be returned was mixed with a mixture of the sludge to be introduced and magnesium hydroxide, and the resulting mixed sludge liquor was subsequently introduced into the oval anaerobic digestion tank 10 from its upper part. The results of this Example are shown in Table 1.

Figure 4:
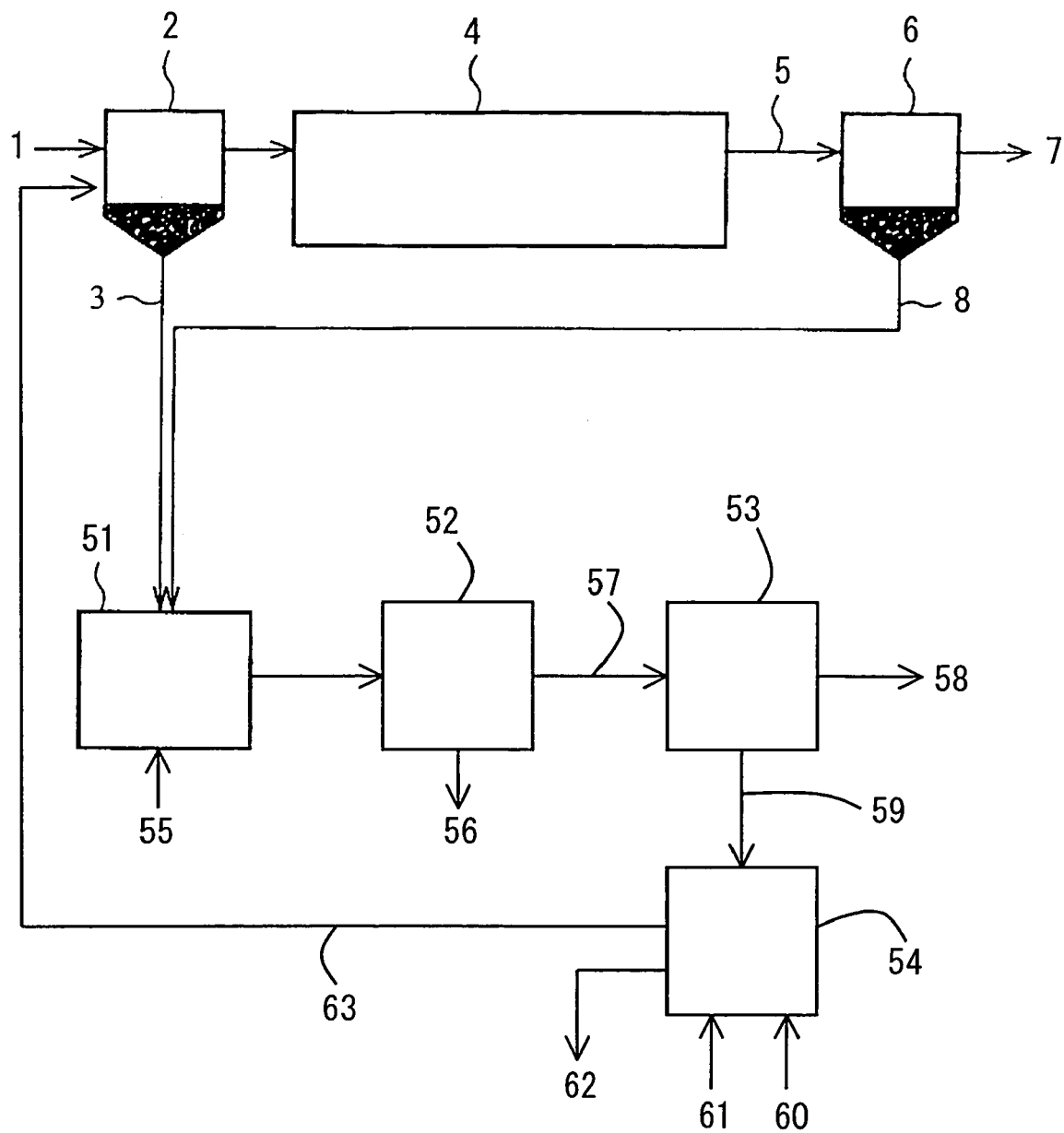
FIG. 4 is a block diagram showing a general view of an organic wastewater treatment process by the conventional method.

As the conventional process 1, an experiment was carried out under the same conditions as in the above described Example except that the magnesium hydroxide was not added and the MAP recovery treatment by the hydrocyclone were not conducted. Further, as the conventional process 2, using the apparatus as shown in FIG. 4 and according to the description of JP-A-2002-45889, the mixed sludge of the first settled sludge 3 and the excess sludge 8 was introduced into an anaerobic digestion tank 51, added with a magnesium source 55 in the same manner as described above and subjected to anaerobic digestion treatment, and then the mixed sludge liquor withdrawn from the anaerobic digestion tank was treated by an MAP recovery device 52 (a hydrocyclone) to effect separation and recovery of MAP crystals 56. Then, the sludge mixed liquor 57 after separation of the MAP crystals was subjected to dehydration treatment 53 and the hydration filtrate 59 was introduced into a second crystallization tank 54 with a hydraulic residence time of 35 minutes, and the magnesium source 60 was added again in an amount of 1.3 times the molar amount of soluble phosphorus and mixed, and by adjusting the pH to 8.5 with a pH adjustor 61, MAP particles 62 were allowed to form and recovered. These results are also shown in Table 1.

TABLE 1

| Items | Introduced Sludge | Conv. Process 1 | Conv. Process 2 | Ex. 1 | Ex. 2 |
|---|---|---|---|---|---|
| SS (%) | 4.5 | 2.9 | 2.2 | 2.0 | 2.0 |
| T-P (mg/L) | 1070 | 1020 | 460 | 350 | 340 |
| $PO_4$—P (mg/L) | 250 | 390 | 34 | 19 | 17 |
| Amount of $Mg(OH)_2$ Added $(g/cm^3)$* | — | — | 940 | 1080 | 970 |
| MAP Recovery in Digestion Tank $(kg/m^3)$ | — | — | 3.7 | 5.1 | 5.1 |
| Total MAP Recovery $(kg/m^3)$** | — | — | 4.4 | — | — |
| MAP Purity (%) | — | — | 87 | 96 | 94 |

*Amount added per 1 $m^3$ of the introduced sludge
**Sum of MAP recovery amount in digestion tank and MAP recovery amount in the second crystallization tank in the conventional process 2

As the properties of the sludge introduced into the oval anaerobic digestion tank, the average SS concentration was 4.5% (45 g/L) and the average T-P (total phosphorus) concentration was 1,070 gm/L. According to the conventional process 1, the SS concentration in the digested sludge was 2.9 g/L; the T-P concentration was 1,020 mg/L; and the $PO_4$-P (phosphorus in the form of phosphate) concentration was 390 mg/L, and a large amount of $PO_4$-P was remained in the digested sludge. According to the process of the present invention, 5.1 kg/L per 1 $m^3$ introduced sludge of MAP crystals were recovered and the T-P concentration in the digested sludge was 350 mg/L while according to the conventional process 2, 3.7 kg/L per 1 $m^3$ introduced sludge of MAP crystals were recovered and the T-P concentration in the digested sludge was 460 mg/L.

According to the process of the present invention, the MAP recovery amount based on the introduced sludge amount was larger by 1.4 kg, and the T-P concentration in the digested sludge was smaller by 100 mg/L. Further, according to the conventional process 2, fine MAP particles remained in the sludge, and accordingly the recovery ratio of MAP formed in the reactor was small. Contrast to this, according to the system of the present invention, by the use of a hardly soluble magnesium source, the improvement of the agitation method in the reactor, and the return of fine MAP particles after the hydrocyclone separation and the like, the growth of MAP particles could be accelerated and the MAP recovery ratio could be improved.

The total MAP recovery amount came to 4.4 kg/m$^3$ according to the system of the conventional process 2 and that according to the process of the present invention came to 5.1 kg/m$^3$ and was larger by 0.7 kg/m$^3$. Further, the purity of the recovered MAP particles was 87% according to the conventional process 2 while that according to the process of the present invention was 96% and improved by 9 points.

From the above results it can be said that the system of the present invention exhibits very effective MP recovery performance, particularly when fine MAP is easily formed.

EXAMPLE 2

Underground water (having a Mg concentration of 48 mg/L) collected near the sewage plant was used as the diluting water for the 35% magnesium hydroxide, and the sludge in sewage plant "A" as used in Example 1 was subjected to the treatment using the diluting water in an amount of 100 L per 1 m$^3$ of the introduced sludge. The amount of the magnesium hydroxide used was reduced from 1,080 g/m$^3$ of sludge to 970 g/m$^3$ of sludge, and the cost of the chemical used could be reduced. It has been found that by effectively using underground water containing magnesium, MAP could be recovered at a lower cost.

EXAMPLE 3

In the present Example, the experiment of acid fermentation-anaerobic digestion and formation and recovery of MAP was carried out with the use of the same sludge of sewage plant "A" as in Example 1 by an apparatus having a constitution as shown in FIG. 3. The first settled sludge 3 in the primary sedimentation tank 2 and the excess sludge 8 in the secondary settling tank 6 were mixed at a ratio of about 1:1 and concentrated by a centrifugal concentrator 9. The concentrated sludge was introduced into an acid fermentor 32. Into the acid fermentor 32, the MAP removed sludge after removal of MAP particles from the digested sludge was also introduced. The acid fermentor 32 was heated at a water temperature of 40° C., and the inside of the fermentor was mixed by an agitator and the pH in the fermentor was controlled to 5.0 to 5.5. The pH was controlled by controlling the flow rate of the MAP removed sludge 15 and the volume of the fermentor was determined so as to secure a hydraulic residence time in the acid fermentor 32 of 10 hours or more. The sludge mixed liquor treated in the acid fermentor 32 was introduced into an MAP particle aging tank 33. Into the particle aging tank 33, slurry 38 containing MAP particles recovered from the digested sludge by an MAP recovery device, magnesium hydroxide 36 and hydrochloric acid or sodium hydroxide as the pH adjustor were introduced. The inside of the particle aging tank 33 was agitated by a hermetically sealed air lift pump using gas phase air, and the pH in the tank was controlled to 7.0 to 7.3. The volume of the particle aging tank 33 was determined so as to render the hydraulic residence time 3 hours.

The sludge mixed liquor 34 (the sludge introduced into the digestion tank) from the particle aging tank 33 was introduced into an anaerobic digestion tank 10 and subjected to medium temperature digestion treatment with a residence time of 25 days. Magnesium hydroxide was added to the aging particle aging tank 33 so as to adjust the magnesium ion concentration in the anaerobic digestion tank 10 in the range of 10 to 30 mg/L. As the agitation system in the anaerobic digestion tank 10, a draft tube plus air lifting system was employed. Although any additive having pH adjusting performance other than the magnesium hydroxide was used, the pH in the anaerobic digestion tank 10 during the experiment was changed within the range of 7.0 to 7.6. From the bottom portion of the anaerobic digestion tank 10, the sludge 12 was withdrawn in an amount of 1.5 times (1.5Q) the amount (1Q) of the sludge introduced, and MAP crystals 14 were separated and recovered by a hydrocyclone 13. Thirty percent (38) of the recovered MAP particles were fed to the particle aging tank 33 and about 0.5Q of the sludge mixed liquor 15 after separation of the MAP crystals was fed to the acid fermentor 32. The remaining 1Q of the sludge mixed liquor 15 after separation of the MAP crystals was introduced into a dehydrator 16 and dehydrated. The dehydration treatment was carried out by a belt press hydrator. The amount of SS in the sludge mixed liquor 34 to be introduced into the anaerobic digestion tank, T-P and PO$_4$-P of the mixed sludge liquor 15 after removal of MAP particles, the purity of the recovered MAP 14, the MAP recovery ratio, and the phosphorus recovery ratio are shown in Table 2. As the conventional process, an experiment of the system of introducing the sludge obtained by mixing and concentrating the first settled sludge and the excess sludge into the anaerobic digestion tank to effect the digestion of the sludge alone was also carried out. This result is also shown in Table 1. Furthermore, an experiment was carried out using the above described apparatus of Example 1 with an amount of the magnesium hydroxide to be introduced into the anaerobic digestion tank of 800 g/m$^3$. This result is also shown in Table 2.

TABLE 2

| Items | Ex. 3 | Process of Ex. 1 | Conv. Process |
|---|---|---|---|
| SS in Sludge Introduced into Digestion Tank (%) | 3.2 | 4.0 | 4.2 |
| T-P in MAP removed Sludge (mg/L) | 360 | 450 | 1140 |
| PO$_4$—P (mg/L) | 19 | 21 | 410 |
| Purity of Recovered MAP (%) | 96 | 96 | — |
| MAP Recovery (kg/m$^3$)* | 6.2 | 5.5 | 0 |
| Recovery of Phosphorus (%)** | 61 | 49 | 0 |

*Amount added per 1 m$^3$ of the introduced sludge
**Recover rate of phosphorus based on the phosphorus load of influent to the sewerage plant The amount of SS in the sludge introduced into the digestion tank was 4.2% with the conventional method while that in the process of Example 1 was 4.0% and that in the process of Example 3 was 3.2%. The comparative small amount of SS in Example 3 is thought due to the mixed presence of the MAP removed sludge having a comparatively low concentration of SS in the acid fermentation. The amount of the phosphorus recovered as MAP was a value as good as 5.5 kg/m$^2$ per 1 m$^3$ of the sludge introduced into the digestion tank even in Example 1 and was a better value of 6.2 kg/m$^2$ in Example 3. Further, the purity of the recovered MAP particles was as high as 95% or more in both methods of Example 1 and Example 3. Converting this value to a phosphorus recovery ratio based on phosphorus in the influent of the sewage plant, it was as high as 49% in Example 1 and further improved to 61% in Examples 3.

INDUSTRIAL APPLICABILITY

The present invention can remarkably increase the recover ratio of MAP and, simultaneously, can form high purity MAP in the MAP treatment process comprising subjecting a sludge mixed liquor containing organic substances, nitrogen and phosphorus to be discharged from an organic wastewater treatment system to anaerobic digestion treatment, and simultaneously removing phosphorus as magnesium ammonium phosphate crystals. Further, the present invention can utilize $Mg(OH)_2$ whose handling has been thought difficult in spite of its low cost, and accordingly enables remarkable reduction of the cost of chemicals. The present invention also enables further reduction of the cost of chemicals by using an aqueous system containing magnesium such as seawater and well water as the dispersion medium for a magnesium compound to be supplied. In addition, the present invention can sufficiently recover MAP of good quality in the anaerobic digestion tank, and thus can exhibit an excellent effect of rendering the recovery of MAP from the dehydration filtrate in the latter stage unnecessary.

The invention claimed is:

1. A sludge treatment apparatus comprising:
an anaerobic digestion tank for receiving a sludge mixed liquor formed in a biological treatment system for organic wastewater to effect the digestion of sludge and, simultaneously, the formation and growth of magnesium ammonium phosphate crystal particles;
a magnesium source feeder for feeding a magnesium source to the anaerobic digestion tank;
a sludge withdrawal pipe for withdrawing a sludge mixed liquor from the anaerobic digestion tank;
a solid-liquid separator for receiving the sludge mixed liquor withdrawn from the anaerobic digestion tank through the sludge withdrawal pipe and separating and recovering solids containing the magnesium ammonium phosphate crystal particles;
piping for returning part of the sludge mixed liquor after separation and recovery of the magnesium ammonium phosphate crystal particles to be recovered from the solid-liquid separator to the anaerobic digestion tank; and
a dehydrator for dehydrating part of the sludge mixed liquor after separation; and
piping for sending part of the sludge mixed liquor, after separation, from the solid-liquid separator to the dehydrator.

2. The apparatus of claim 1, wherein the solid-liquid separator is a hydrocyclone.

3. The apparatus of claim 1, wherein the solid-liquid separation apparatus is a hydrocyclone for receiving the sludge mixed liquor withdrawn from the anaerobic digestion tank through the sludge withdrawal pipe and separating the sludge mixed liquor into a sludge mixed liquor containing a fine magnesium ammonium phosphate particle having a particle diameter of 100 µm or less and a slurry mainly containing grown magnesium ammonium phosphate particles and recovering the slurry.

4. A crystallization reaction apparatus comprising:
a crystallization reactor for receiving water to be treated containing an ion to be treated to form a hardly soluble salt of the ion to be treated;
a salt-forming ion feeder for feeding a salt-forming ion capable of forming the hardly soluble salt by the reaction with the ion to be treated in the water to be treated into the crystallization reactor;
a reaction solution discharge pipe for withdrawing a reaction solution after reaction from the crystallization reactor;
a solid-liquid separator for subjecting the reaction solution withdrawn from the crystallization reactor through the reaction solution discharge pipe to solid-liquid separation to separate and recover grown crystal particles;
piping for returning part of the reaction solution after separation and recovery of the grown crystal particles to be recovered from the solid-liquid separator to the crystallization reactor;
a dehydrator for dehydrating part of the reaction solution after separation; and
piping for sending part of the reaction solution after separation from the solid-liquid separator to the dehydrator.

5. A sludge treatment apparatus comprising:
an acid fermentor for receiving a sludge mixed liquor formed in a biological treatment system for organic wastewater to effect the treatment of sludge by acid fermentation;
a particle aging tank where a magnesium source is added to the mixed sludge liquor to be discharged from the acid fermentor to allow crystal particles of magnesium ammonium phosphate to grow;
a magnesium source feeder for feeding a magnesium source to the particle aging tank;
an anaerobic digestion tank for receiving a sludge mixed liquor to be discharged from the particle aging tank to effect the digestion of sludge and the growth of crystal particles of magnesium ammonium phosphate;
a sludge withdrawal pipe for withdrawing a sludge mixed liquor from the anaerobic digestion tank;
a solid-liquid separator for receiving the sludge mixed liquor withdrawn from the anaerobic digestion tank through the sludge withdrawal pipe to separate and recover solids containing the magnesium ammonium phosphate crystal particles;
piping for feeding part of the sludge mixed liquor after separation and recovery of the magnesium ammonium phosphate crystal particles to be recovered from the solid-liquid separator into the acid fermentor;
piping for feeding the crystal particles of magnesium ammonium phosphate to be recovered from the solid-liquid separator into the particle aging tank;
a dehydrator for dehydrating part of the sludge mixed liquor after separation; and
piping for sending part of the sludge mixed liquor after separation from the solid-liquid separator to the dehydrator.

6. The apparatus of claim 5, wherein the solid-liquid separation apparatus is a hydrocyclone.

7. The apparatus of claim 5, wherein the solid-liquid separation apparatus is a hydrocyclone for receiving the sludge mixed liquor withdrawn from the anaerobic digestion tank through the sludge withdrawal pipe and separating the sludge mixed liquor into a sludge mixed liquor containing a fine magnesium ammonium phosphate particle having a particle diameter of 100 µm or less and a slurry mainly containing grown magnesium ammonium phosphate particles and recovering the slurry.

* * * * *